May 8, 1945.   A. D. LUND   2,375,424
GRID PASTING MACHINE
Filed March 22, 1940   7 Sheets-Sheet 1

INVENTOR
ARTHUR D. LUND
ATTORNEY

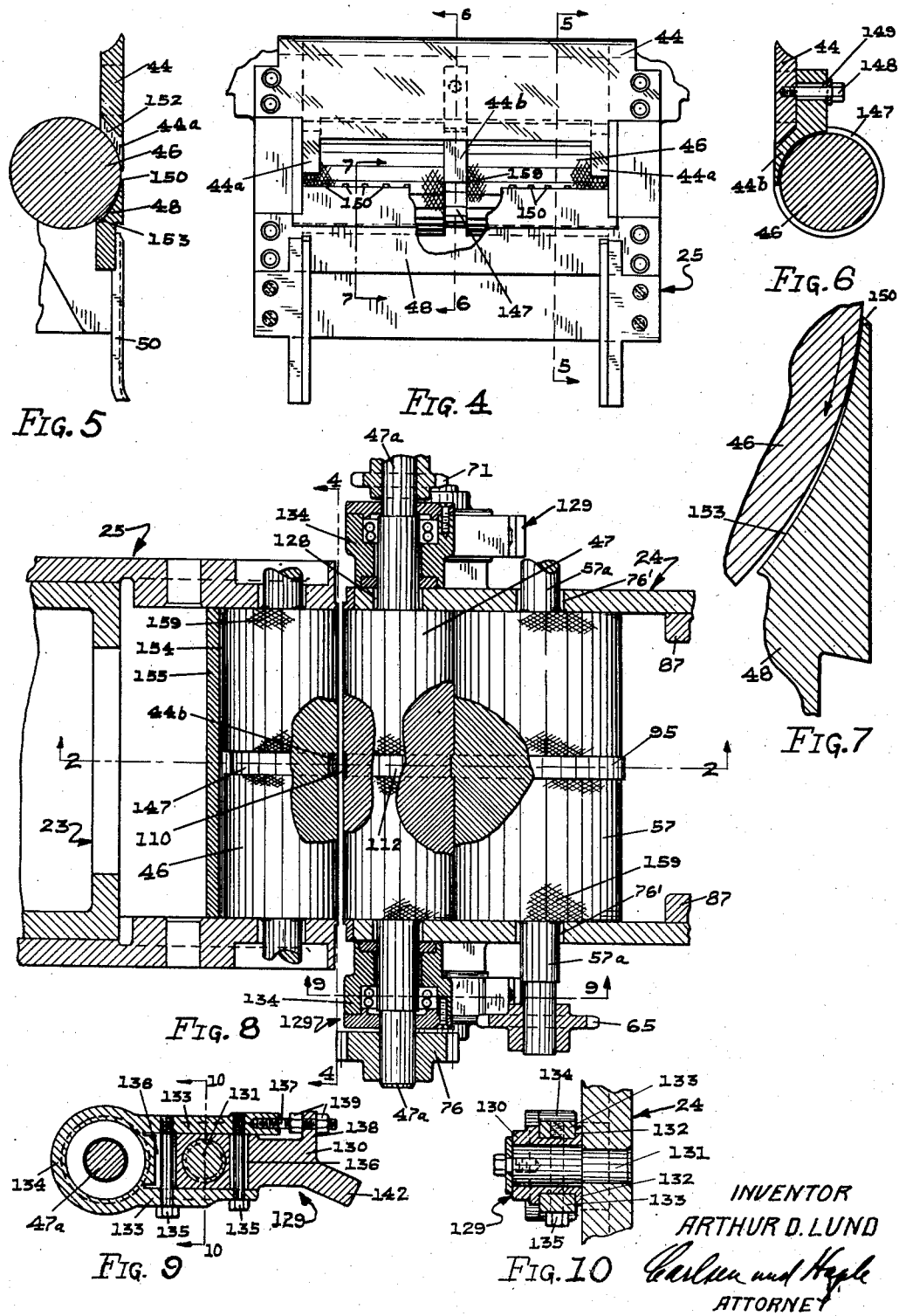

May 8, 1945.  A. D. LUND  2,375,424
GRID PASTING MACHINE
Filed March 22, 1940  7 Sheets-Sheet 4
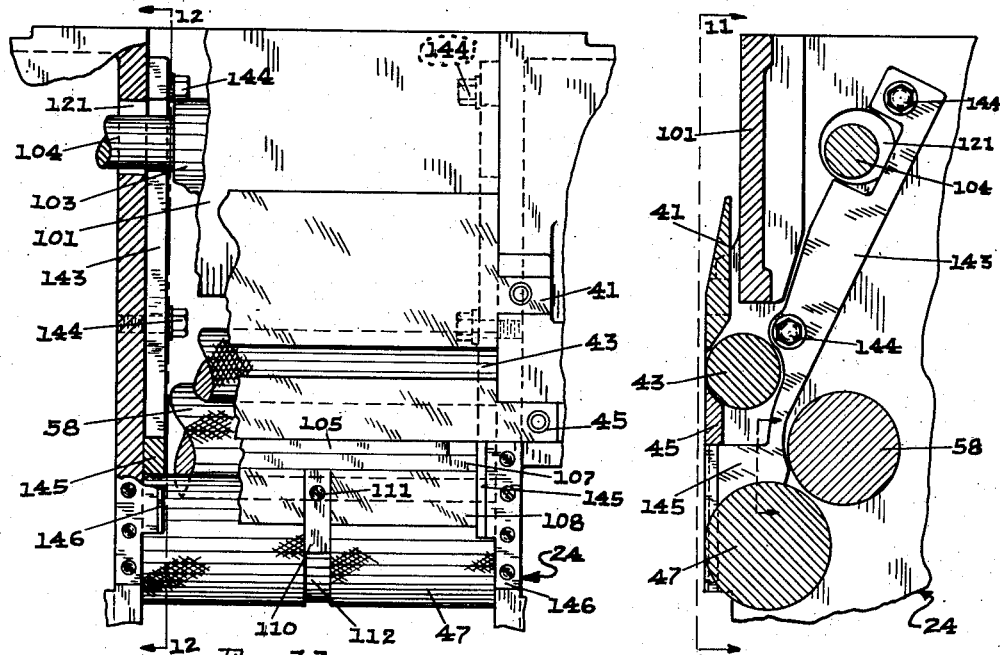
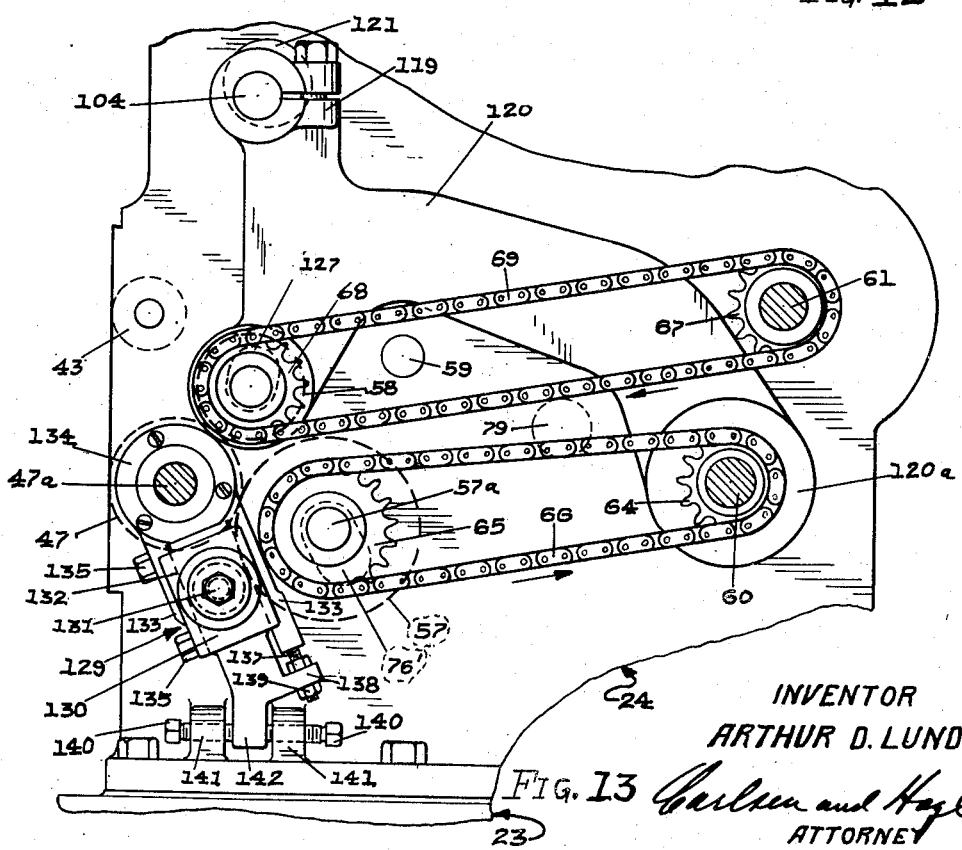
INVENTOR
ARTHUR D. LUND
ATTORNEY

INVENTOR
ARTHUR D. LUND
ATTORNEY

May 8, 1945.   A. D. LUND   2,375,424
GRID PASTING MACHINE
Filed March 22, 1940   7 Sheets-Sheet 6
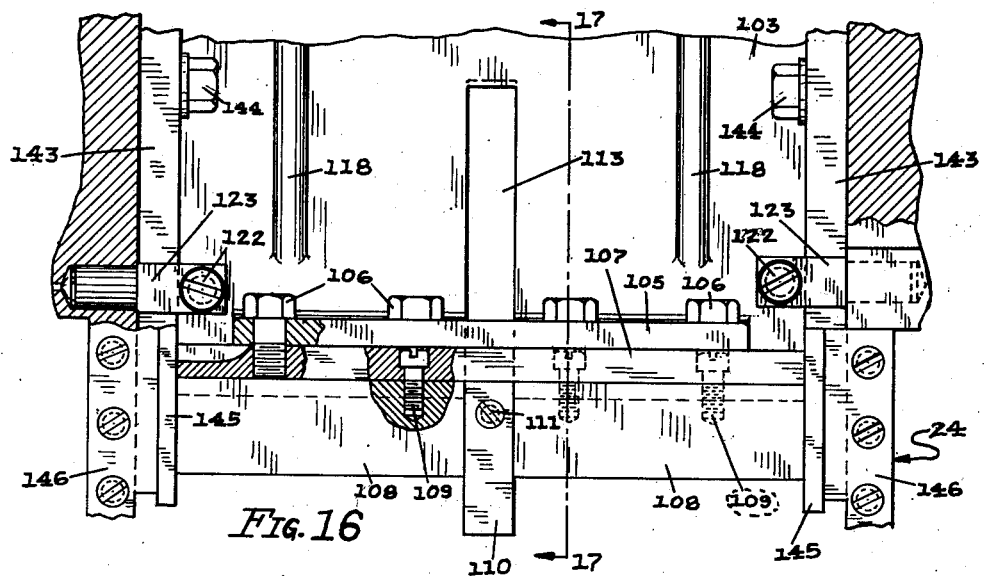
Fig. 16
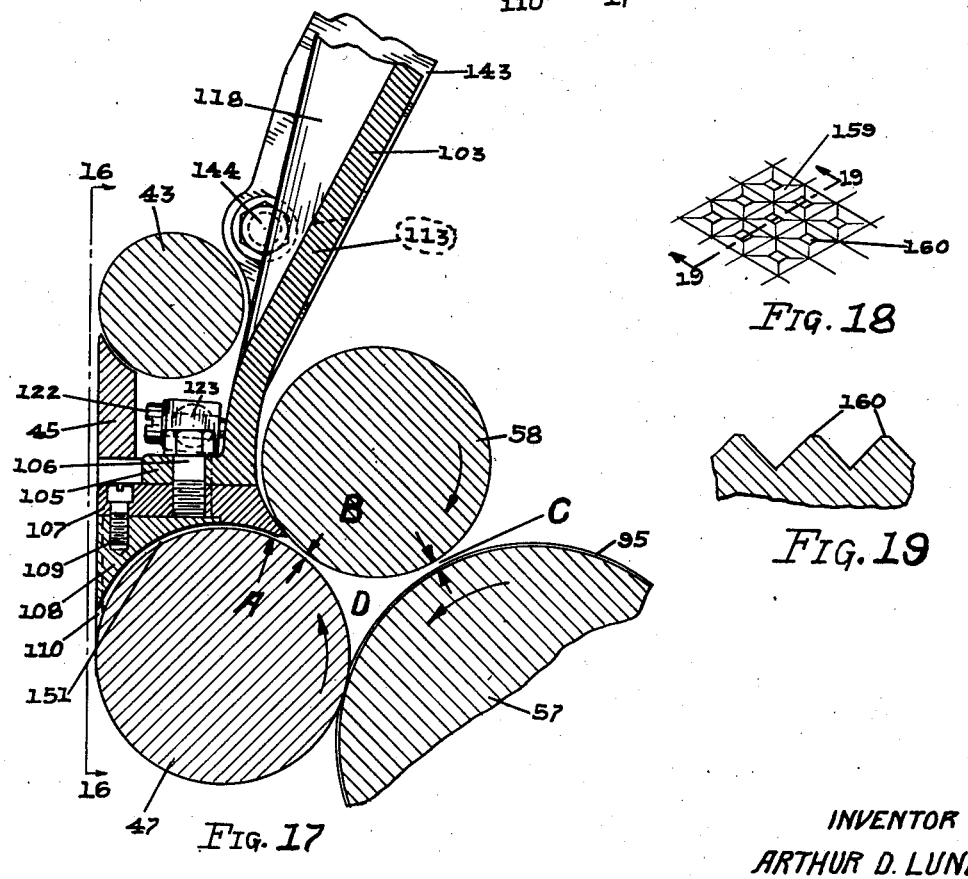
Fig. 17
Fig. 18
Fig. 19
INVENTOR
ARTHUR D. LUND
ATTORNEY May 8, 1945.                A. D. LUND                    2,375,424
                        GRID PASTING MACHINE
                     Filed March 22, 1940        7 Sheets-Sheet 7

INVENTOR
ARTHUR D. LUND
ATTORNEY

Patented May 8, 1945

2,375,424

UNITED STATES PATENT OFFICE 2,375,424

GRID PASTING MACHINE

Arthur D. Lund, Minneapolis, Minn., assignor, by mesne assignments, to General Motors Corporation, a corporation of Delaware Application March 22, 1940, Serial No. 325,408

20 Claims. (Cl. 226—39.6)

This invention relates to apparatus for filling grid plates for storage batteries, and the main object is to provide an efficient, practical, and novel machine for applying active material to the plates, while also accurately and properly controlling the paste flow and the movement of the plates through the paste applying area. More particularly the invention represents a number of well defined and thoroughly tested and proven features which are improvements over the structures disclosed in my earlier Patents No. 2,081,943 and No. 2,081,944, both of which issued on June 1, 1937, for Grid pasting machines.

In the accompanying drawings, which illustrate preferred embodiments of the invention—

Fig. 4 is an elevation looking toward the carriage side of the grid plate passageway on line 4—4 in Fig. 8, fractional portions being broken away for purpose of illustration.

Fig. 5 is a sectional elevation on line 5—5 in Fig. 4.

Fig. 6 is a detail sectional elevation on line 6—6 in Fig. 4.

Fig. 7 is an enlarged detail section on line 7—7 in Fig. 4.

Fig. 8 is a sectional plan view on line 8—8 in Fig. 2, but showing the feed roller in full except minor portions that are in section.

Fig. 9 is a sectional detail view of an adjustable roller bearing support device, as seen on line 9—9 in Fig. 8.

Fig. 10 is a detail section on line 10—10 in Fig. 9.

Fig. 11 is an elevation of the paste feeding side of the grid plate passage, with various parts broken away and in section for purpose of illustration, this view showing the parts of the machine as seen when looking in the direction of line 11—11 in Fig. 12.

Fig. 12 is a sectional elevation on line 12—12 in Fig. 11.

Fig. 13 is a right side elevation of the end of the machine shown in Fig. 1, but with guards removed to show the driving mechanism for certain of the roller shafts.

Fig. 16 is an enlarged detail elevation corresponding to a portion of Fig. 11, and also as seen on line 16—16 in Fig. 17.

Fig. 17 is a sectional elevation on line 17—17 in Fig. 16.

Fig. 18 is an enlarged detail showing the knurling used on all of the feed roller surfaces.

Fig. 19 is an enlarged section as on the line 19—19 in Fig. 18.

Figure 1:
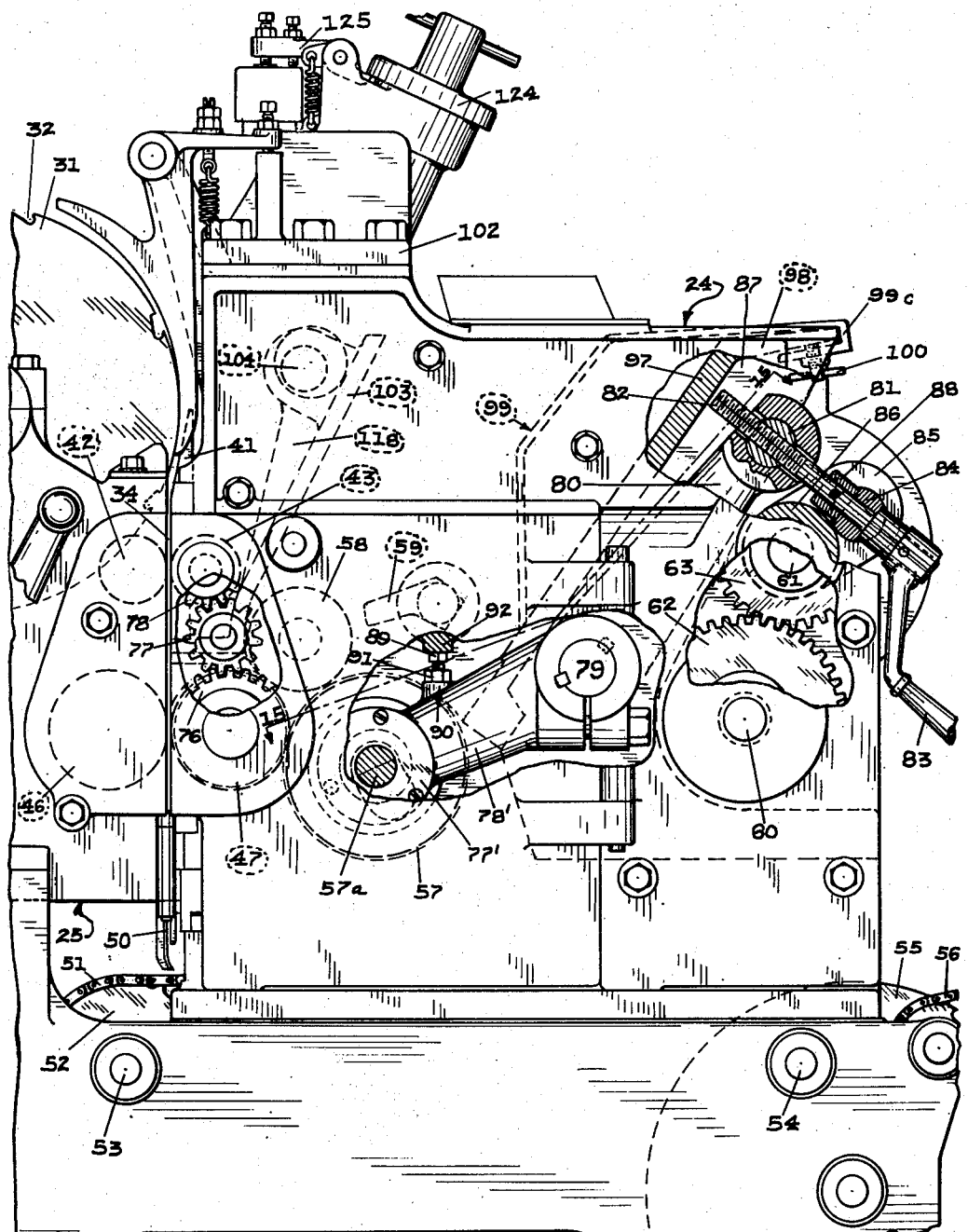
Fig. 1 is a side elevation of a substantial part of the machine, with various parts broken away for purpose of illustration, this side of the machine being considered as the right hand side and the left or operator's end of the machine being considered, as a matter of convenience in description, as the front end.

Referring to the drawings more particularly and by reference characters, 23 designates a heavy cast frame base upon the rear end portion of which is rigidly mounted a paste receptacle and feed unit 24, and upon the forward portion of which is adjustably mounted a carriage 25. The units 23, 24, and 25 correspond to the units 10—11, 27, and 92, respectively, of the structure disclosed in my earlier Patent No. 2,081,944, and the carriage 25 may be controlled in its adjustments with respect to the unit 24 by the mechanism provided therefor in said patent. To facilitate consideration of the inventive features here involved, it may be explained that I have also omitted some of the drive connections, plate carrier devices, certain adjusting apparatus, and other structural details which are common to my aforesaid prior patents and to which reference is directed for more complete disclosure of such mechanisms.

Figure 20:
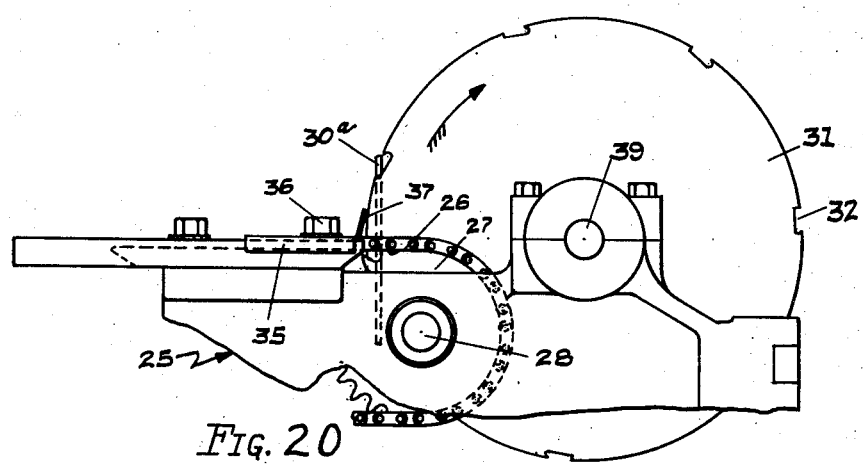
Fig. 20 is a detail side elevation showing an improvement in the grid plate feeding mechanism.
Figure 21:
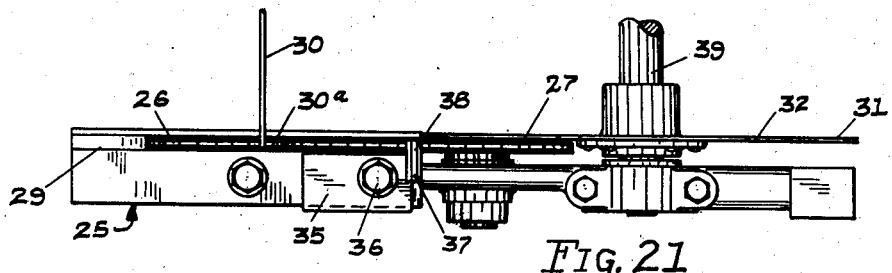
Fig. 21 is a plan view of the structure shown in Fig. 20.
Figure 22:
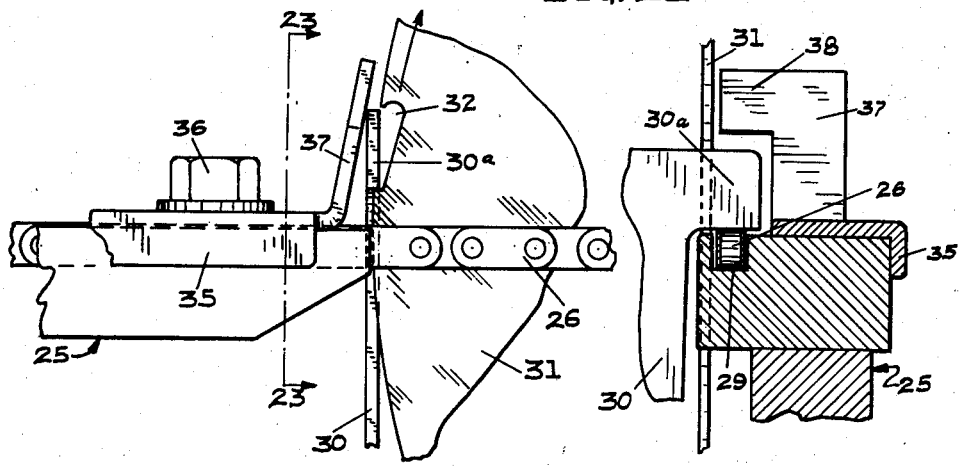
Fig. 22 is an enlarged detail elevation corresponding to a part of Fig. 20, but showing a grid plate in position on the disk carrier.
Figure 23:
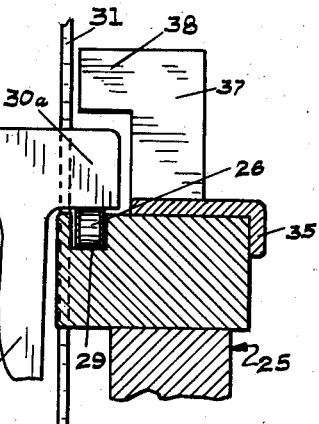
Fig. 23 is a detail sectional elevation on line 23—23 in Fig. 22.

The grid plates to be filled with active material are initially advanced toward the pasting unit by an endless conveyor which includes a pair of transversely spaced sprocket chains 26 (one of which is shown in Figs. 20-22). These chains extend about sprockets 27 having shafts 28 journaled in the carriage 25, and the upper runs of the chains are supported and move in channels 29 in the upper side walls of the carriage. The conveyor chains are so spaced that they may support the lugs 30a at the upper corners of the grid plates 30, while the body of each plate is carried in suspended position between the chains.

The conveyor operates to move the plates into frictional contact with the peripheral edges of a pair of carrier disks 31 which are provided with notches 32 to engage the plate lugs and then lift the plates successively from the chain conveyor and transfer them over to the receiving throat 33 of a vertical grip plate passageway 34 down through which the plates may pass to be filled with the active paste, all as described more in detail in my Patent No. 2,081,944.

In my earlier machine some difficulty was experienced in effecting a proper transger of plates from the conveyor 26 to the carrier disks 31, due to the fact that the plate lugs 31 would not always move sufficiently far into the notches 32, and this would occasionally result in displacement of a plate before transfer into the passage 34. To overcome this difficulty I have provided the carriage 25 with a pair of brackets 35, secured by bolts 36, and each having an arm 37 terminating in an inwardly projecting cam 38. This cam is so formed and arranged that it will engage the plate lug 30a as it is removed from the conveyor 26 and will urge it fully into the recess, as the disk moves upwardly and which will be particularly evident by the disclosure in Fig. 22. The disks 31 are mounted on a shaft 39 journaled in the carriage, and are of course driven in proper synchronism with the conveyor 26 and other parts of the machine.

The grid plates being delivered by the carrier disks 31 into the tapered throat 33, formed by bars 40 and 41, move into engagement between a pair of rollers 42 and 43 which continue to feed the plates down between guide bars 44 and 45, and into engagement with paste applying rollers 46 and 47. From these rollers the plates continue down between another set of guide bars 48 and 49, and through friction guides 50 from which they pass to a delivery conveyor formed by chains 51 and sprockets 52 mounted on shafts 53 and 54. The grids are then picked up by a pair of transfer disks 55 which place them on another chain conveyor 56, by which they are taken from the machine for further treatment elsewhere.

The paste feed unit 24 includes, in addition to rollers 46 and 47, three other power driven rotary members in the form of a hopper bottom forming main feed roller 57, a cooperating feed roller 58, and a shaft supported feed paddle 59, the specific arrangement and functions of which will presently be described.

The rotary members 46, 47, 57, 58, and 59 of the paste applying unit are power operated through the following transmission devices. A motor (not shown) is connected with a drive shaft 60 mounted rearwardly in the unit frame. At the right side of the machine, but within the guard housings, the shaft 60 drives a shaft 61 through gears 62 and 63 (see Fig. 1), and drives the roller 57 through sprockets 64 and 65, and chain 66, as shown in Fig. 13; and this view also discloses shaft 61 as operating roller 58 through sprockets 67 and 68 and chain 69.

Figure 14:
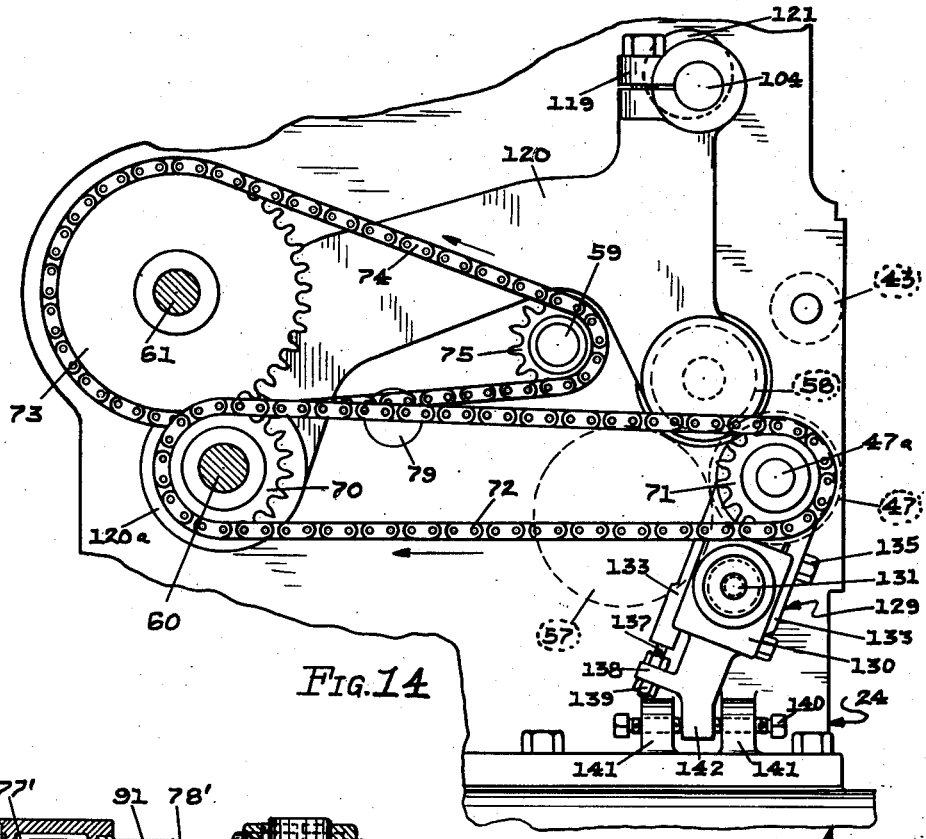
Fig. 14 is an elevation of the same part of the machine as shown in Fig. 13, but of the left or opposite side thereof, this view illustrating other driving connections between certain rollers and shafts.

At the opposite or left hand side of the machine, as shown in Fig. 14, the shaft 60 operates through sprocket gears 70 and 71, and chain 72 to drive roller 47; and the shaft 61 drives the paddle shaft 59 through sprocket gear 73, chain 74, and pinion 75.

Referring again to Fig. 1, it will be seen that the roller 47 operates through a gear 76, idler 77, and pinion 78 to rotate roller 43. The gear members 76 and 78 of rollers 47 and 43 mesh with similar gears on rollers 46 and 42, respectively, to rotate the latter in the same manner as illustrated in Fig. 1, of Patent No. 2,081,944.

Figures 2, 3:
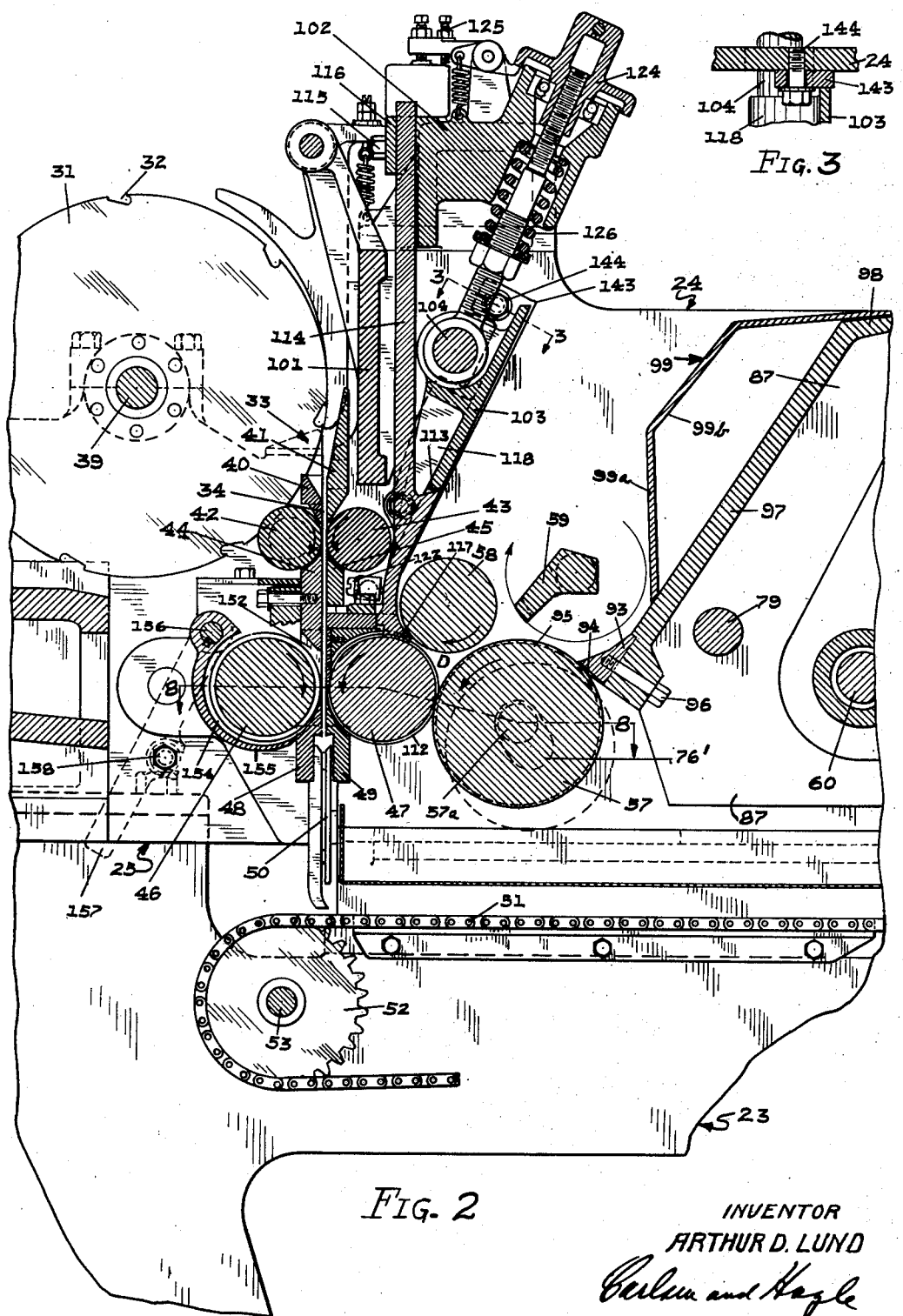
Fig. 2 is a sectional elevation taken centrally and longitudinally through the machine substantially as on the line 2—2 in Fig. 8.
Fig. 3 is a detail sectional view on the line 3—3 in Fig. 2.

An important feature of the present invention is the mounting for the comparatively large roller 57 which normally forms a moving bottom for the paste chamber, and as shown by full and dotted lines in Fig. 2, is subject to a substantial adjustment movement downwardly from its normal operating position adjacent rollers 47 and 58. The primary purpose of this adjustment is to separate the parts and open the pocket formed by rollers 57, 47, and 58 to remove foreign objects and to permit easier and quicker scraping and cleaning of the roller surfaces between periods of use.

Figure 15:
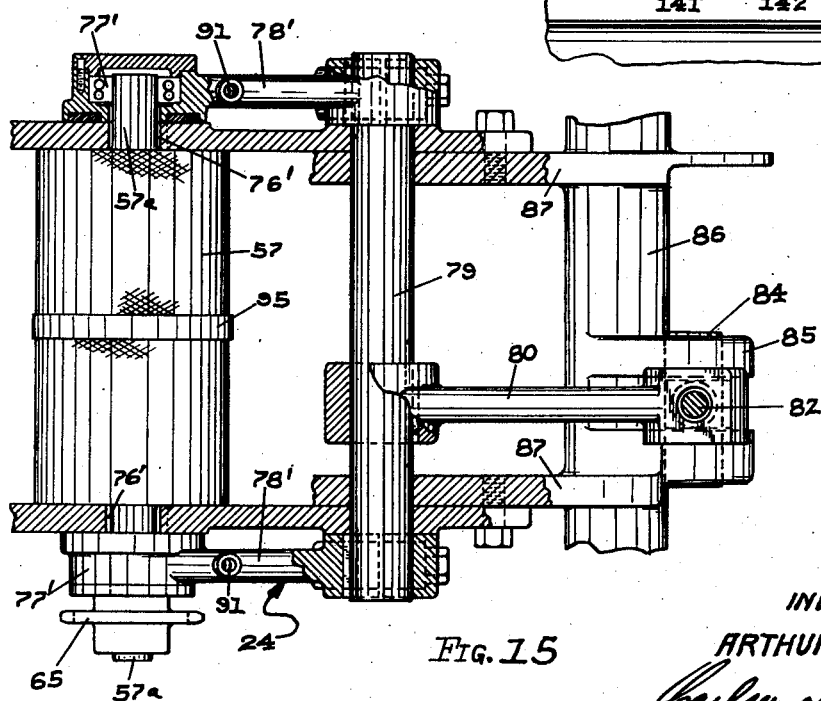
Fig. 15 is a plan view partly in section on an irregular line 15—15 in Fig. 1.

With this objective the roller 57 is not journaled in the side walls of the paste hopper, but has shaft ends 57a which extend through slots 76' in said side walls and into bearings 77' in the front ends of a pair of arms 78'. These arms are rigidly secured at their rear ends to a shaft 79 which is journaled for oscillating movement in the side walls. It may be noted, with particular reference to Fig. 15, that while the roller shaft ends have clearance for free movement in the hopper walls, such clearance does not permit any leakage of paste because the end surfaces of the roller are in close contact with the inner wall surfaces and permit no paste to escape therebetween.

The oscillatable shaft 79 is provided between the side walls but offset with respect to the center of the machine, with an upwardly and rearwardly directed control arm 80 (Figs. 1 and 15), which is rigidly keyed to the shaft for controlling the same and cooperates therewith and with the arms 78' to comprise a lever acting frame support for the roller. At its upper end the arm 80 has a bearing ball 81 in which is threaded a bar 82, one end of which is provided with an operating handle 83. To prevent endwise movement of the bar, when the handle is turned, and thus impart movement to the arm 80, I journal the bar in a short shaft 84 journaled in bearing lugs 85 of a sleeve 86 which in turn forms an integral connection between side wall sections 87. A collar 88 locks the bar 82 against endwise movement in the shaft 84.

From the foregoing it will be evident that by turning the crank 83 in one direction the roller 57 can be moved downwardly to the dotted line position shown in Fig. 2, and that turning of the crank in the opposite direction will lift or restore the roller to its normal operative position. In order to accurately position the roller and to compensate for wear, I provide a pair of adjustable stops in the form of set screws 89, secured in lugs 90 of the arms 78', and having lock nuts 91. The heads of these set screws stop against lug extensions 92 of bearings for the paddle shaft 59, as shown in Fig. 1. When moving the roller 57 up into operative position the crank 83 is turned until the set screws 89 stop against the lugs, and, as already indicated, adjustment of one or both of the screws 89 can be made to compensate for wear and to accurately re-position the roller with respect to adjacent parts of the machine.

Cooperating with the paste supporting surface of the roller 57 is a shoe 93 which extends the entire length of the roller, with its edge in contact therewith, and has a center notch 94 adapted to snugly receive an annular rib 95 on the roller. The shoe is secured by bolts 96 to the lower end of an inclined rear wall plate 97 which extends transversely between the hopper side walls, and terminates at its upper end in an annular ledge extension 98. The side edges of the back wall 97—98 are integral with forward portions of the aforementioned side wall sections 87, and as these wall forming parts are all preferably made of heavy cast material the resulting structure is obviously strong and rigid.

The back wall 97 supports a quick detachable supplemental or auxiliary wall plate 99 which is shaped as shown in Fig. 2 so as to provide a lower vertical portion 99a, an intermediate inclined portion 99b, and an upper portion which terminates in a hook 99c which engages over the ledge 98 and is releasably secured in place by a clamp screw 100 (Fig. 1).

The purpose of this plate 99 is to insure proper movement of paste down into the feed rolls, while also being quickly and easily removable to permit better access to the feed rolls for cleaning, repair, removal of foreign objects, etc. It may be explained that the purpose of the rotary paddle 59 is to engage paste fed into the chamber from above and force it into the space between the rollers 57 and 58, but without the plate 99 in place there is a decided tendency for the paddle 59 to merely push the incoming paste back up on the inclined wall 97. With the plate inserted, however, the vertical disposition of the plate part 99a is such as to prevent the back movement of the paste, and cause it to move down under the paddle shaft where it will be more effectively acted upon by the paddle. It will also be understood that this construction is advantageous to one in which the stationary rear wall would be disposed in the position of plate sections 99a and 99b, because in the latter instance the chamber opening would be so restricted that working access to the rollers would be very difficult if not impossible.

Attention is now directed to the forward portion of the paste applying unit 24, and it may first be noted that the front ends of the side walls are rigidly connected by a heavy cross beam 101, while a cross head 102 is bolted down upon the upper edges of the walls.

A forward wall forming plate 103 is supported by a shaft 104, and extends down between the rollers 43 and 58, terminating in a horizontal bottom flange 105, to which is secured, by bolts 106, a transversely extending shoe 107. The toe edge of this shoe (see Fig. 17) is tapered rearwardly, for scraping engagement with roller 58, but is spaced from the roller 47 to limit the thickness of the paste layer and thereby the amount of paste that will be carried over on the roller 47 to the pasting zone.

The shoe 107 in turn supports a guide bar 108, the same being anchored by bolts 109, and the forward face of this bar complements the front end edge of the shoe 107 and forward surface of bar 45, to define a portion of the grid plate passage. The bar 108 has a center insert 110, secured as at 111, for engagement in the groove 112 of roller 47.

The plate 103 has a center slot 113, down through which extends a bar 114, the upper end of which is rigidly but adjustably secured by a bolt 115 in a socket 116 formed in the crosshead 102. At its lower end the bar 114 terminates in a shoe 117 that fits in the groove 112 to remove paste therefrom as the roller 47 rotates. Except for adjustments to compensate for wear the bar 114 and roller 47 remain relatively fixed, and this condition prevails even though the parts 58 and 103 are simultaneously adjusted as must be done to effect occasional adjustments in the volume of paste being conveyed to the grids. The purpose of the shoe 117 and insert 110 is to effectively separate the paste ribbon into two strips, one for each grid opening in the plate, and to prevent the application of paste to the center parting bar or plate strip between the grid surfaces proper.

The plate 103 has vertical flanges 118 through which extends the supporting bar or shaft 104, and said shaft is in turn rigidly secured at its ends in clamps 119 formed as integral parts of a pair of irregular levers 120. These levers are disposed upon outer sides of the receptacle side walls, and such walls have openings 121 through which the shaft ends extend with sufficient freedom to permit substantial vertical movement of the shaft.

The wall plate 103 is subject to slight movement about the axis of shaft 104, for the purpose of adjusting the shoe 107 with respect to the roller 58, and this adjustment may be accurately controlled by a pair of set screws 122 (Figs. 2, 16, 17) mounted in side wall studs 123 and bearing against opposite side parts of the plate 103.

The shaft 104 is connected by an adjustable safety device 124 to a circuit breaker 125 so that when the plate 103 and roller 58 move upwardly as by a foreign object under the roller, then the motor circuit will be disconnected, as is more fully described in my aforementioned Patents No. 2,081,943 and No. 2,081,944; and a spring 126 tends to restore and hold the parts 58 and 103 in normal position.

The levers 120 are provided at their rear ends with hubs 120a that are trunnioned for oscillating movement about the axis of shaft 60. Forward ends of the levers 120 serve as bearing supports for the roller 58 and the shaft ends of this roller extend through slots 127 to permit vertical movement of the shaft with this end of the lever, and also with the shaft 104 and plate 103 as previously referred to.

Roller 47 has shaft ends 47a that extend through slots 128 in the side walls and are journaled in adjusting devices designated generally by numeral 129. These devices permit various yet accurate adjustments to either or both ends of the roller 47 and this has been found to be of substantial importance in the practical success of this machine.

Each of the adjusting devices 129 comprises a body member 130 which is trunnioned on an arbor 131, fixed in the side wall, and has a pair of laterally formed channels 132 in which are slidably disposed a pair of arms 133 that extend integrally from a bearing 134 for the shaft end 47a. These arms are rigidly clamped to the member 130 by bolts 135. As shown in Fig. 9, however, these bolts extend through slots 136 which permit limited adjustment of the arms on the member when the bolts are loosened. This adjustment is accurately obtained through the medium of a stud bolt 137 which is anchored in one of the arms 133 and is moved with respect to a lug 138 by opposed lock nuts 139. By this adjustment the roller can be accurately adjusted radially with respect to the center of arbor 131.

The roller 47 is also adjustable arcuately with respect to the arbors 131 by tilting action of the devices 129 on the arbors, this adjustment being effected and controlled by a pair of opposed set screws 140 that are mounted in fixed lugs 141 and operated against an intermediate tail extension 142 of the body member 130, as shown in Figs. 13 and 14.

As it is desirable to paste only the reticulated portions of the grid plates, and as the widths of these portions will vary in different sizes of plates, it is necessary to design the machine and provide means whereby the width of the paste ribbons may be changed to conform with the particular size of plates to be run in a given stock or batch. With this objective in view I provide interchangeable parts to conform with standard grid widths, but without necessitating the substitution of rollers and other parts that are difficult to properly replace and adjust.

In Figs. 2, 11, 12, 16, and 17 are shown a pair of side filler bars 143 that are secured upon the inner surfaces of the paste receptacle side walls by bolts 144, and the inner faces of these bars are in close contact with the side edges of plate 103 to seal in the paste at these points. The lower ends of these bars extend down between the rollers 43 and 58 and terminate in arcuately recessed feet 145 that fit snugly upon end portions of the roller 47 so as to definitely restrict the total width of the paste ribbon to the transverse spacing between said feet. The front vertical edges of the feet are laterally recessed to fit against side pieces 146 secured on the front edges of the walls.

When relatively narrow grids are to be treated a correspondingly narrow end plate 103 is employed, in which event comparatively thick filler bars 143 will be used. Conversely, when wider grids are to be pasted a wider end plate is substituted, and it is then necessary to also substitute narrower filler bars 143, or possibly omit them entirely. It may here also be noted that when these changes are made in the paste unit mechanism, on one side of the grid passage, then the carriage side of the passage can be similarly converted or altered by substituting other guide bars 44 (see Fig. 4), the feet 44a of which are either narrower or wider as occasion may necessitate. This bar 44 also has a center finger 44b which complements the insert 110 and operates in roller groove 147. The finger 44b, as shown in Fig. 6, is secured to bar 44, by bolt 148, the bolt hole 149 being sufficiently large to permit adjustments of the member with respect to roller 46 when the bolt is loosened.

The guide bars 48 and 49 that initially receive the pasted grid plates from the rollers 46 and 47 correspond to the bars 83 and 84 in my Patent No. 2,081,944 and as recognized in that case should extend as far as possible up between the rollers. The present construction, however, embodies further refinements which have substantially improved my earlier design and these will now be explained.

It may first be noted that the upper edges of these bars are necessarily thin and that one purpose of these edges is to remove excess paste from the rollers with a shaving action. A long taper is not practicable, however, as it renders the edge too weak and flexible, which in turn does not permit it to properly engage the roller or to give support to the downwardly moving plate. A short or blunt taper, on the other hand, is found to create a condition where excess paste will not be scraped off from the plate surface but will move down against the taper surface building up pressure that forces the edge into excessive frictional contact with the roller. All of these objections have been overcome, however, by the present design in which, as shown in Figs. 4 and 7, the upper edge or end of the blade has a flat or blunt surface except for a series of spaced teeth 150 which taper toward the roller. These teeth operate to prevent the downwardly moving grid plates from catching on the blunt edge of the blade and thereby also guide the plates downwardly into proper moving contact with the opposed faces of the bars 48 and 49. The teeth do not, however, cause any wedging or forcing reaction from paste pressure. It is also found that excess paste caught in the small pocket above the blunt blade edge finds its way upwardly into the surplus which accumulates on the surfaces of the rollers 46 and 47 immediately above the level of plate contact. The accumulated paste just referred to builds in the slightly tapered but arcuate channel 151, between roller 47 and bar 108 (Fig. 17); and in the recess 152 (Fig. 5) formed between bar 44 and roller 46.

Although the bar 48 has its toothed edge in surface contact with the roller it recedes therefrom downwardly, leaving a tapered arcuate recess 153 (Figs. 5 and 7). This recess eliminates objectionable friction contact between the members 46 and 48, and continues in the form of an arcuate pocket 154 between the roller 46 and a semi-cylindrical shell 155. This shell is mounted on a transverse shaft 156 that is journaled in the carriage and may be rocked by a handle 157 releasably secured by bolt 158 (see Fig. 2). Thus by releasing the handle 157 and swinging it upwardly the shell 155 will open downwardly to discharge the paste that has accumulated in the pocket, this being done when the machine is being cleaned at the end of a running period. When in operation the handle 157 is locked down, at which time the lower edge of the shell is in closing contact with the rear surface of bar 48. As the pocket 153—154 becomes wider in the direction of roller (46) rotation there is no tendency for the paste in it to create an appreciably frictional resistance. It may be noted that the paste which gathers in the pocket 154 and may even build up on top of the roller, is not wasted but acts as a surplus which is continuously being worked over into the plates and insures complete filling of each grid. Should it be observed that the surplus is becoming excessive then the operator has only to make an adjustment in the paste volume being discharged by the paste feeding unit 24.

To insure an accurate and uniform flow of paste from the paste chamber to the train of grid plates it is necessary that the rollers 47, 57, and 58 be properly correlated as to size and spacing, and direction and speed of travel. These factors are all fairly evidenced by the drawings, which are consistent with a machine that has been in use for some time. The following observations may, however, be made, and particular reference is made to Fig. 17.

For the best results I leave a clearance of one-thousandth of an inch between the peripheral surfaces of rollers 47 and 57. The space A between roller 47 and the inner or beveled edge of the shoe 107 is variable by adjustment and determines the volume of paste being conveyed to the applying zone through the recess 151. The spacing B between rollers 47 and 58 is preferably about one thirty-second of an inch larger than spacing A; and the spacing C between rollers 57 and 58 is preferably twice the size of spacing B.

The three rollers 47, 57, and 58 rotate in the directions of the indicating arrows and cooperate to form what may conveniently be referred to as a pressure pocket D, substantially triangular in cross sectional contour as shown in Figs. 2 and 17.

As the paste is filled into the hopper it moves down into contact with the paddle 59 which, as it continuously revolves, keeps forcing the paste through the relatively largest space C into the pocket D, and this feed action is of course greatly augmented by surface friction of rollers 57 and 58 which both rotate in that direction. The paste is then fed by rollers 58 and 47 through openings B and A, successively, but as these openings are smaller than opening C, enough pressure is created in pocket D to insure a compact, positive, and uniform paste flow to the channel 151. Meanwhile the shoe member 117 and insert 110, by engaging in the groove 112, entirely remove the central paste strip, or rather maintain division of the original ribbon and thereby prevent any paste from being applied on the center bar of the double grid plate.

Another feature which has considerably increased the efficiency of this machine over my prior machines resides in the improved surface treatment of rollers, whether used for plate contact only, as with rollers 42 and 43; for paste contact only, as with rollers 57 and 58; or for both plate and paste contact, as with rollers 46 and 47. This surface treatment consists of first knurling the surface in criss-cross manner, as shown at 159 (Figs. 4, 8, 11, 15, and 18) and then grinding off the sharp points of the surface projections, as indicated at 160 in Figs. 18 and 19, which are, however, greatly enlarged views. The resulting roughened surface is one which not only possesses maximum grip, but has an effective smooth top or scraping surface that is accurate in cylindrical contour and is easily cleaned.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a grid plate pasting machine having a paste receptacle and a plate passageway, primary and secondary feed rollers rotating in the same direction and forming the bottom for the receptacle, said secondary feed roller operating immediately adjacent to the primary feed roller for conveying a layer of paste therefrom and applying it to grid plates in the passageway, a stationary part having an arcuate wall spaced from the secondary roller and defining an arcuate paste-layer confining channel leading from the receptacle to the pasting zone of the passageway, and means cooperating with the rollers for forcing the paste into the entrance of said channel.

2. In a grid plate pasting machine having a paste receptacle and a plate passageway, a primary feed roller forming the bottom for the receptacle, and a secondary feed roller operating immediately adjacent to the primary feed roller for conveying paste therefrom and applying it to grid plates in the passageway, said secondary feed roller having a peripheral groove intermediate its ends, and a shoe operating in said groove.

3. In a grid plate pasting machine having a paste receptacle and a plate passageway, primary and secondary feed rollers rotating in the same direction and forming the bottom of the receptacle, said secondary feed roller operating immediately adjacent to the primary feed roller for conveying a layer of paste therefrom and applying it to the grid plate in the passageway, said secondary roller having a peripheral groove intermediate its ends, a stationary part having an arcuate wall spaced from the secondary roller and defining an arcuate paste-layer confining channel leading from the receptacle to the pasting zone of the passageway, means cooperating with the rollers for forcing the paste into the entrance of the channel, and means located at the entrance and at the exit of the arcuate channel and received by the groove of the secondary roller for causing separation of the paste-layer into two ribbons.

4. In a grid plate pasting machine, juxtapositioned primary and secondary feed rollers for conveying paste from a supply source to a plate passageway, and a third roller cooperating with the first mentioned rollers to form a pocket that is generally triangular in cross sectional contour, said third roller being spaced closer to the secondary roller than to the primary roller whereby the paste passing into the pocket will be retarded and subjected to spreading compression when being discharged from the pocket.

5. In a grid plate pasting machine having a paste receptacle and a plate passageway, a roller for conveying paste and for forcing it into a grid in the passageway, stationary means cooperating with said roller to provide a paste-layer confining channel having its entrance in the receptacle and through which a layer of paste is moved by said roller, a second feed roller located close to the first mentioned roller and away from the channel entrance, a third feed roller located close to the channel entrance and spaced from the first and second feed rollers at a distance greater than the spacing between the first and second rollers, the three rollers cooperating to define a paste confining pocket having an exit close to the channel entrance and having an entrance in the paste receptacle and means for moving paste toward the entrance of said pocket.

6. In a grid plate pasting machine, a paste receptacle formed in part by side walls and a removable end wall, a roller mounted between said side walls to receive paste from the receptacle and apply it to grid plates, said end wall extending generally upwardly from said roller, a pair of removable filler bars disposed between the sides of the end wall and the respective side walls, and having foot portions engaging end parts of the roller, said end wall and filler bars being replaceable by corresponding elements of different proportions to thereby control the surface length of the roller between said foot portions of the filler bar.

7. In a grid plate pasting machine having a paste receptacle and a grid plate passageway, a primary roller forming a bottom for the receptacle, a secondary roller arranged to receive paste directly from the primary roller and apply it directly to plates in said passageway, and a lever acting frame fulcrumed in the machine to adjustably support said primary roller.

8. In a grid plate pasting machine, a paste receptacle having a rear wall, a roller spaced forwardly from the lower end of the wall for applying paste to plates in a plate passageway, and another roller filling the space between the lower end of the wall and the first mentioned roller to form a moving bottom for the receptacle, a frame fulcrumed in the machine to adjustably support said other roller, and a manually operative control mechanism disposed rearwardly of said wall for adjusting the frame.

9. In a grid plate pasting machine having a paste receptacle and a grid plate passageway, a pair of adjacent rollers for conveying paste from the receptacle to the passageway, a third roller disposed over adjacent surfaces of the first mentioned rollers, a plate forming the front wall of the receptacle, means for mounting the plate and said third roller for simultaneous upward movement, said plate having a shoe spaced from one roller of the pair to define the thickness of the paste layer, said shoe having an edge in shaving contact with the surface of said third roller.

10. In a grid plate pasting machine having a paste receptacle and a grid plate passageway, a pair of adjacent rollers for conveying paste from the receptacle to the passageway, a third roller disposed over adjacent surfaces of the first mentioned rollers, a plate forming the front wall of the receptacle, means for mounting the plate and said third roller for simultaneous upward movement, said plate having a shoe spaced from one roller of the pair to define the thickness of the paste layer, said shoe having an edge in shaving contact with the surface of said third roller, and means for adjusting the relative position of said plate and shoe with respect to said third roller.

11. A grid plate pasting machine comprising, in combination, a plate passageway, means for moving plates through the passageway, a paste hopper, a roller for carrying a layer of paste supplied from the hopper to the pasting zone of the passageway and for forcing the paste layer into the plate, stationary means having a plane wall providing a portion of the passageway at the pasting zone and having an arcuate wall spaced from the roller and cooperating therewith to provide a paste layer confining channel and having an edge located adjacent to the entrance to said channel and spaced from said roller, means for forcing paste from the hopper into said channel and including two other feed rollers which define with the first roller a paste receiving pocket having its exit adjacent the edge of the stationary means, one of said two other rollers being located close to said edge so as to be scraped thereby, and means for moving paste from the hopper into the pocket.

12. A grid plate pasting machine comprising, in combination, a plate passageway, means for moving plates through the passageway, a paste supply source, juxtaposed primary and secondary feed rollers for conveying paste from the supply source to the passageway, and a third roller cooperating with the first mentioned roller to form a pocket that is generally triangular in cross-sectional contour, said third roller being spaced closer to the secondary roller than to the primary roller whereby the paste passing into the pocket will be retarded and subjected to spreading compression when being discharged from the pocket whereby a paste layer is formed upon the secondary feed roller, and means for confining said paste-layer upon the secondary feed roller while said layer is being transferred from the pocket to the plate-pasting zone of the passageway.

13. A grid plate pasting machine comprising, in combination, a plate passageway, means for moving the plate through the passageway, a paste supply source, means for causing paste to move as a ribbon-like layer from the source to the passageway and to be applied as a layer to the plate in the passageway, said means comprising a rotating roller and a stationary member having a cylindrical surface cooperating with the roller to provide an arcuate paste confining channel defining the thickness of the paste layer conveyed by the roller, a second paste feed roller rotating in the same direction as the first mentioned roller and located close to the first roller, a third paste feed roller rotating in a direction opposite to that of the first two rollers and spaced from the first and second rollers at distances greater than the spacing between the first and second rollers, the three rollers cooperating to form a pocket that is generally triangular in cross section and which has its exit close to the entrance of the arcuate channel, and means for moving paste from the paste supply source into the pocket.

14. A grid plate pasting machine comprising, in combination, a plate passageway, means for moving the plate through the passageway, a paste supply source, means for causing paste to move as a ribbon-like layer from the source to the passageway and to be applied as a layer to the plate in the passageway, said means comprising a rotating roller and a stationary member having a cylindrical surface cooperating with the roller to provide an arcuate paste confining channel defining the thickness of the paste layer conveyed by the roller, a second paste feed roller rotating in the same direction as the first mentioned roller and located close to the first roller, a third paste feed roller rotating in a direction opposite to that of the first two rollers and spaced from the first and second rollers at distances greater than the spacing between the first and second rollers, the three rollers cooperating to form a pocket that is generally triangular in cross section and which has its exit close to the entrance of the arcuate channel, the third roller being located closer to the first roller than to the second roller whereby the paste passing into the pocket will be retarded and subjected to spreading compression when being discharged from the pocket, and means for moving paste from the paste supply source into the pocket.

15. A grid plate pasting machine comprising, in combination, a plate passageway, means for moving plates through the passageway, a paste supply hopper, means for causing paste to move as a ribbon-like layer from the hopper to the pasting zone of the passageway and to be applied as a layer to the plate in the passageway, said means comprising a rotating roller and a stationary member having a cylindrical surface cooperating with the roller to provide an arcuate paste confining channel defining the thickness of the paste layer conveyed by the roller, a second paste feed roller cooperating with the first roller to provide the bottom of the hopper and rotating in the same direction as the first roller and located close to the first roller, a third paste feed roller located in the hopper above the first and second rollers and rotating in a direction opposite to the direction of rotation of the first and second rollers and spaced from the first and second rollers at distances greater than the spacing between the first and second rollers, the three rollers cooperating to form a pocket that is generally triangular in cross section and which has its exit close to the entrance of the arcuate channel, and means for moving paste from the paste supply source into the pocket.

16. A grid plate pasting machine comprising, in combination, a plate passageway, means for moving plates through the passageway, a paste supply hopper, means for causing paste to move as a ribbon-like layer from the hopper to the pasting zone of the passageway and to be applied as a layer to the plate in the passageway, said means comprising a rotating roller and a stationary member having a cylindrical surface cooperating with the roller to provide an arcuate paste confining channel defining the thickness of the paste layer conveyed by the roller, a second paste feed roller cooperating with the first roller to provide the bottom of the hopper and rotating in the same direction as the first roller and located close to the first roller, a third paste feed roller located in the hopper above the first and second rollers and rotating in a direction opposite to the direction of rotation of the first and second rollers and spaced from the first and second rollers at distances greater than the spacing between the first and second rollers, the three rollers cooperating to form a pocket that is generally triangular in cross section and which has its exit close to the entrance of the arcuate channel, and a paddle located in the hopper and rotating in the same direction as the third roller for moving paste into the pocket.

17. A grid plate pasting machine comprising, in combination, a plate passageway, means for moving plates through the passageway, a paste supply hopper, means for causing paste to move as a ribbon-like layer from the hopper to the pasting zone of the passageway and to be applied as a layer to the plate in the passageway, said means comprising a rotating roller and a stationary member having a cylindrical surface cooperating with the roller to provide an arcuate paste confining channel defining the thickness of the paste layer conveyed by the roller, a second paste feed roller cooperating with the first roller to provide the bottom of the hopper and rotating in the same direction as the first roller and located close to the first roller, a third paste feed roller located in the hopper above the first and second rollers and rotating in a direction opposite to the direction of rotation of the first and second rollers and spaced from the first and second rollers at distances greater than the spacing between the first and second rollers, the three rollers cooperating to form a pocket that is generally triangular in cross section and which has its exit close to the entrance of the arcuate channel, the third roller being located closer to the first roller than to the second roller whereby the paste passing into the pocket will be retarded and subjected to spreading compressions when being discharged from the pocket, and a paddle located in the hopper and rotating in the same direction as the third roller for moving paste into the pocket.

18. A grid plate pasting machine comprising, in combination, a plate passageway, means for moving plates through the passageway, a paste supply hopper, means for causing paste to move as a ribbon-like layer from the hopper to the pasting zone of the passageway and to be applied as a layer to the plate in the passageway, said means comprising a rotating roller and a stationary member having a cylindrical surface cooperating with the roller to provide an arcuate paste confining channel defining the thickness of the paste layer conveyed by the roller, a second paste feed roller cooperating with the first roller to provide the bottom of the hopper, and rotating in the same direction as the first roller and located close to the first roller, a third paste feed roller located in the hopper above the first and second rollers and rotating in a direction opposite to the direction of rotation of the first and second rollers and spaced from the first and second rollers at distances greater than the spacing between the first and second rollers, the three rollers cooperating to form a pocket that is generally triangular in cross section and which has its exit close to the entrance of the arcuate channel, a paddle located in the hopper and rotating in the same direction as the third roller for moving paste into the pocket, the back wall of the hopper having a substantially vertical portion located in close proximity to the path of the rotating paddle whereby to increase the effectiveness of the paddle to move paste into the pocket between the rolls.

19. A grid plate pasting machine comprising, in combination, a plate passageway, means for moving plates through the passageway, a paste supply hopper, means for causing paste to move as a ribbon-like layer from the hopper to the pasting zone of the passageway and to be applied as a layer to the plate in the passageway, said means comprising a rotating roller and a stationary member having a cylindrical surface cooperating with the roller to provide an arcuate paste confining channel defining the thickness of the paste layer conveyed by the roller, said roller having a blunt knurled surface, the blunt portions of the knurls being parts of the same cylindrical surface, said cylindrical surface of the stationary member being smooth, and other rollers knurled like the first roller and cooperating with the first roller to define a paste receiving pocket at the entrance to the arcuate channel from which paste moves with the first roller into the channel.

20. A grid plate pasting machine comprising, in combination, a plate passageway, means for moving the plate through the passageway, a paste supply source, means for causing paste to move as a ribbon-like layer from the source to the passageway and to be applied as a layer to the plate in the passageway, said means comprising a roller and a member having a cylindrical surface spaced from the roller, means receiving paste from the hopper and for spreading it upon the roller, means for confining the layer upon the roller while said layer is being moved to the pasting zone, means for adjusting the thickness of said layer so as to provide a slight surplus, a back-up roller on the side of the passageway opposite to the paste-applying roller for engaging the paste pushed through the grid wires of the plate, said rollers cooperating to define the thickness of the paste material on the plate, said back-up roller removing the surplus, and means cooperating with the back-up roller for returning the surplus of paste to the pasting zone.

ARTHUR D. LUND.